(12) United States Patent
Dando et al.

(10) Patent No.: US 10,843,295 B2
(45) Date of Patent: Nov. 24, 2020

(54) UNDER MATERIAL AIR PURGE

(71) Applicant: Preco, Inc., Somerset, WI (US)

(72) Inventors: Austin Dando, Roberts, WI (US);
Daniel B. Miller, Roberts, WI (US);
Joshua Butz, River Falls, WI (US);
Donald R. Sloan, Stillwater, MN (US)

(73) Assignee: PRECO, INC., Somerset, WI (US)

( * ) Notice: Subject to any disclaimer, the term of this patent is extended or adjusted under 35 U.S.C. 154(b) by 71 days.

(21) Appl. No.: 16/163,311

(22) Filed: Oct. 17, 2018

(65) Prior Publication Data

US 2019/0047086 A1 Feb. 14, 2019

Related U.S. Application Data

(62) Division of application No. 15/266,852, filed on Sep. 15, 2016, now Pat. No. 10,376,989.

(Continued)

(51) Int. Cl.
*B23K 26/142* (2014.01)
*B23K 26/14* (2014.01)
(Continued)

(52) U.S. Cl.
CPC ........ *B23K 26/142* (2015.10); *B23K 26/0846* (2013.01); *B23K 26/1462* (2015.10); *B23K 26/402* (2013.01); *B23K 2103/42* (2018.08)

(58) Field of Classification Search
CPC ...... B23K 26/14; B23K 26/142; B23K 26/16; B23K 26/1462; B23K 26/0846; B23K 26/402; B23K 26/123; B23K 26/1464
See application file for complete search history.

(56) References Cited

U.S. PATENT DOCUMENTS 3,601,576 A 8/1971 Schafli
5,726,411 A * 3/1998 Abreu .................... B23K 26/03
219/121.7

(Continued)

FOREIGN PATENT DOCUMENTS

CN 204818448 U 12/2015
EP 1449798 A2 8/2004
(Continued)

OTHER PUBLICATIONS

Extended European Search Report issued in related European patent application No. 17174188.7, dated Oct. 20, 2017.

*Primary Examiner* — Stella K Yi
(74) *Attorney, Agent, or Firm* — Westman, Champlin & Koehler, P.A.; Z. Peter Sawicki; Amanda M. Prose

(57) ABSTRACT

An assembly and method of reducing discoloration of a foam material resulting from laser processing the material comprising an assembly configured for positioning below the material being processed and for directing air into open cells of the open-cell foam material to pressurize the material during laser processing. The assembly comprises an air delivery mechanism comprising one or more apertures for an air chamber positioned directly below the material travel path. Aligning the one or more apertures with the axis of the laser beam and its focal point when the material is positioned above the one or more apertures and pressurizing or filling of the open cells with air in the direct vicinity of the target area reduces processing related discoloration of the material. The cells are laser processed concurrently with pressurization thereby substantially reducing settling of debris and smoke on the material and reducing discoloration.

9 Claims, 3 Drawing Sheets

Related U.S. Application Data

(60) Provisional application No. 62/344,802, filed on Jun. 2, 2016.

(51) Int. Cl.
*B23K 26/08* (2014.01)
*B23K 26/402* (2014.01)
*B23K 103/00* (2006.01)

(56) References Cited

U.S. PATENT DOCUMENTS

| | | |
|---|---|---|
| 2008/0230523 A1 | 9/2008 | Graf |
| 2017/0080522 A1 | 3/2017 | Nishihara et al. |

FOREIGN PATENT DOCUMENTS

| | | | |
|---|---|---|---|
| JP | S61182893 A | | 8/1986 |
| JP | 2007229811 | * | 9/2007 |
| WO | 2008015550 A2 | | 2/2008 |

* cited by examiner

UNDER MATERIAL AIR PURGE

CROSS-REFERENCE TO RELATED APPLICATION

The present application is based on and claims the benefit of U.S. non-provisional patent application Ser. No. 15/266,852, filed Sep. 15, 2016, which is based on and claims the benefit of U.S. provisional patent application Ser. No. 62/344,802, filed Jun. 2, 2016, the content of which are hereby incorporated by reference in their entirety.

BACKGROUND

The present invention relates to laser processing of materials, and more particularly to the reduction of discoloration and odor caused by laser processing foam materials.

Lasers are currently being used to modify materials in a vast array of products and markets. There are many lasers types and wavelengths available to choose from to best match performance desired in a given material and application. Even with the best selection for a given product and application there can be some undesirable affects due to the nature of the laser process itself that may need to be overcome for the successful use of the laser. One of these undesirable affects is in the form of smoke/debris contamination that can form on the product that occurs during laser processing. There are various ways of dealing with this contamination that work well in certain applications but not necessarily all applications for a variety of reasons.

One such application involves processing a porous foam material with a high speed steered beam system and CO2 laser. The process involves creating blind holes in the foam material that is holes which do not go through the entire depth of the material. The high speed laser processing results in some smoke/debris contamination on the foam—and in the porous areas of the foam. In certain applications, such as medical applications, this is an undesirable effect. This contamination results in a discoloration of the foam that can increase in intensity over time.

SUMMARY

An aspect of the present disclosure relates to an under material air purge assembly for reducing discoloration of a material resulting from laser processing the material. The assembly comprises a forced air delivery mechanism and air chamber having one or more apertures. The air chamber is configured for positioning directly below a material travel path in a laser processing system. The assembly is further configured for positioning such that the one or more apertures can be directly substantially aligned with an axis of a laser beam and/or its focal point. Thus, the assembly is configured to provide air from the air chamber directly into a porous or open cell foam material, providing air under pressure while laser processing the porous or open cell foam material.

The porous or open cell foam material may be an open-cell foam type material such that when air is directed into the open cell foam material, air under pressure within the open cell foam material is released, thereby expelling debris and smoke created by the laser processing from the processing site, for example a blind hole. The debris and smoke is sufficiently expelled from the processing site such that discoloration normally resulting from the laser processing is virtually eliminated. The assembly is configured to selectively pressurize areas in an open cell foam material in the direct vicinity of where the laser beam is processing (e.g., processing site) such that the cells being laser processed or the cells in the immediate vicinity of the laser processing site are pressurized, thereby releasing air and preventing debris and smoke generated during laser processing from settling into or near the blind hole and adjoining surface of the porous material.

The air chamber comprises an outer rotating tube with a perforation pattern on its surface. The perforations may be spaced apart and positioned in one or a plurality of rows substantially covering the surface of the outer rotating tube. In one embodiment, the rows of perforations extend around the entire outer surface of the rotating tube. An inner stationary tube defines an air chamber wherein forced air is provided to the air chamber. The inner stationary tube has an opening for allowing air out of the air chamber. In one embodiment the opening has a single slit extending longitudinally along the length of the inner tube. The outer tube rotates about the inner tube such that air is directed through the perforations of the outer tube when the perforations are aligned with the opening of the inner tube. Thus, air is directed out through only a selected portion of the perforations when such selected portion of perforations is aligned with the opening. The opening and the selected portion of perforations through which air is directed are also substantially aligned with the axis of the laser beam, resulting in debris and smoke being expelled upwardly from the blind hole and minimizing debris and smoke from touching and attaching to the surface of the porous material.

Another aspect of the present disclosure relates to a method of reducing discoloration in a porous or open cell material where the discoloration results from laser processing the material. The method comprises providing an air delivery mechanism described herein to a laser processing system wherein the air delivery mechanism provides air under pressure into an air chamber. The air chamber comprises one or more apertures through its outer wall thereby providing air under pressure to the porous or open cell material passing over its outer surface. The method further comprises aligning the one or more apertures with the laser beam with the material positioned between the one or more apertures and the focal point of the laser beam and feeding the material through the laser processing system and over the air delivery mechanism. Delivering air through the one or more apertures and into the material while directing the laser beam to a processing site wherein the material is pressurized reduces discoloration that otherwise would have resulted from the laser processing.

DETAILED DESCRIPTION

Figure 1:
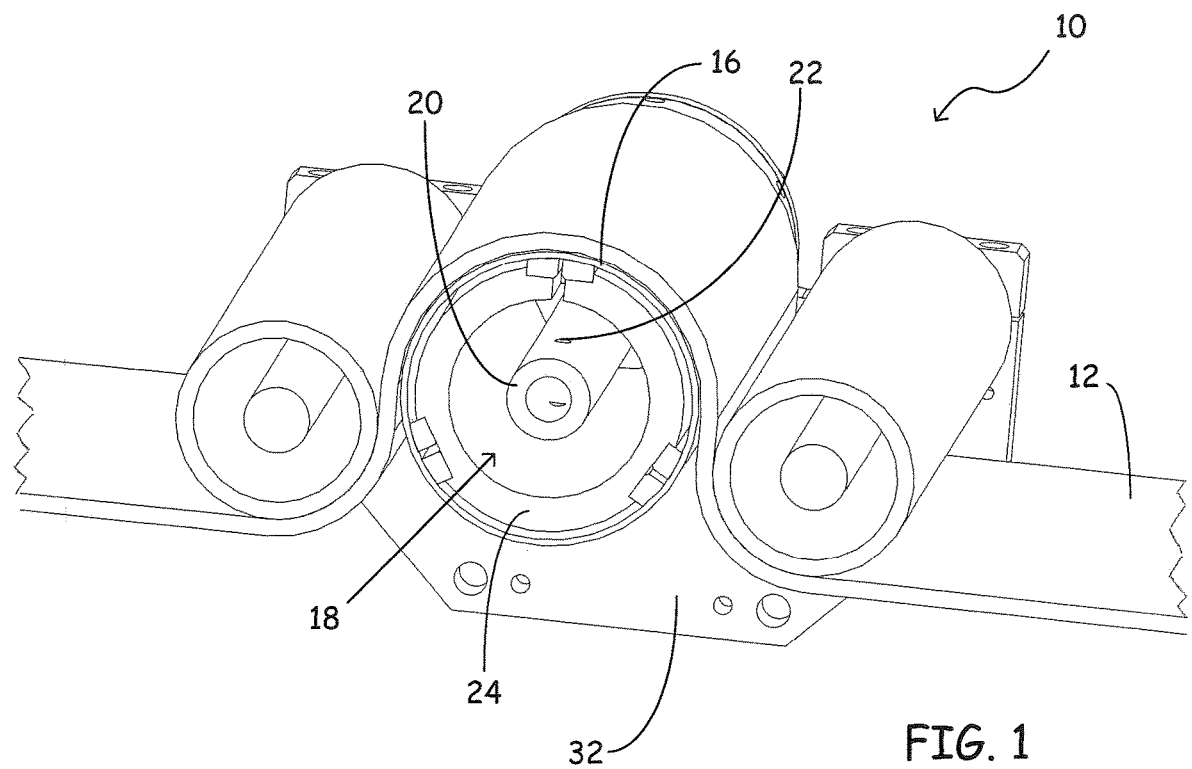
FIG. 1 is perspective view of an under material air purge assembly of the present disclosure.

This disclosure relates to an assembly, a laser processing system, and a method for reducing discoloration and/or odor in materials that have been processed using a laser system. Such laser processing, for example, includes cutting, scoring, perforating or the creation of blind holes. It has been found that the discoloration and/or odor arising from the use of a laser system is reduced significantly or essentially eliminated by the use of an under material air purge apparatus which is configured to pressurize individual cells of an open cell foam material. Pressurization of the cells being laser treated is done using an under material air purge apparatus. In one embodiment, the material cells are pressurized concurrently with the laser processing.

This disclosure also includes articles made from material, particularly porous open cell material processed by a laser that is substantially discoloration-free as well as odor-free. The articles can be used immediately after laser processing or at a time after laser processing, when discoloration or "yellowing" would otherwise begin to show. The articles made from the laser-processed material do not display any significant discoloration.

A laser system or laser-based system as referred to herein relates to a system that processes material through the use of laser technology. Lasers provide a very efficient method of cutting, scoring, perforating or otherwise preparing material for various end uses over the old mechanical systems which may include die systems. Lasers cut and score through the use of a collimated amplified beam of light that terminates in a focal point. It is at the focal point of the beam that processing (e.g. cutting, perforating, scoring takes place). Intense heat at the focal point processes the material in what can be described as essentially a burning process. A by-product of burning a polyurethane based foam material is the resulting discoloration, which may increase over time.

Although polyurethane-based foam materials are specifically mentioned herein, this disclosure encompasses other materials that can be processed by a laser and because of such processing, discoloration of the material develops. This disclosure is applicable to the processing of open cell foams of various constructions and polymers.

An under material air purge assembly is illustrated generally at 10 in FIGS. 1-3B. The under material air purge assembly is configured for use with a laser processing system 100. The under material air purge assembly 10 is configured to provide forced air directly to the material while laser processing the material. The air is selectively delivered to a processing site or target area (e.g. the area of the material being laser processed) to pressurize the cells of an open-cell foam material during laser processing. Pressurizing the open cells of the material expels smoke and debris generated during laser processing (also referred to herein as a "plume"). It is hypothesized that smoke and debris that is not evacuated by the top exhaust during laser processing either returns to the base foam, or is vaporized by the laser beam during processing. The debris that returns to the base foam enhances yellowing as the material ages. Thus, directing air into the cells while laser processing the material prevents the plume from settling on the material, attaching and/or penetrating the cellular material, which has been pressurized with forced air flow. The plume is then expelled, for example, upwardly away from the material and a top exhaust system further removes the plume.

The under material air purge 10 is an assembly configured for positioning within a processing window of the laser processing system 100. The under material air purge assembly 10 is generally positioned "under" the material being processed, or such that the material is positioned between a laser source and resulting laser beam 15 and the air purge apparatus 10. For example, the polyurethane-based foam material 12 being laser processed in a roll to roll system (e.g. continuously processed, web processing) is separated from a carrier liner 11, which is directed below the assembly 10 while the material 12 is laser processed as the material 12 is positioned and passive over the air purge assembly 10.

In general, the air purge assembly 10 is a tubular structure operably connected to a source of forced air. The assembly comprises an air chamber 18 and the tubular structure comprises a plurality of apertures 14 positioned such that the forced air is directed through the air chamber 18 and out of a selected aperture or plurality of apertures 14. The selected aperture(s) 14 are those apertures positioned substantially directly in line with the axis of the laser beam and a focal point 13 of the laser beam(s) 15 during laser processing. Additionally, or alternatively, air may also be forced out of apertures 14 adjacent the apertures 14 directly below the focal point 13 concurrently and/or sequentially.

The air flow is directed out of the selected apertures 14 in order to force the air flow directly into the foam material 12. The air is directed to an area of the material 12 that the laser beam focal point 13 is concurrently processing (e.g. processing site or material target area). As such, the open-cell structure of the foam material 12 allows the target area of the foam material 12 to be pressurized, for example, substantially concurrently with laser processing and/or directly subsequent to or directly preceding laser processing. The open cells in the foam receive the directed air flow and are pressurized as the laser is directed thereto, thus "filling" the open cells with forced (pressurized) air and minimizing the plume generated by laser processing from settling in the cells. This substantially reduces discoloration of the material due to laser processing the material.

As illustrated in the figures, the air purge assembly 10 comprises a central component 16 having the one or more apertures 14. The apertures may also be referred to as "perforations" in the outer shell of the central component. For example, the central component or tube 16 may be a tubular extrusion 16 which is adapted with the plurality of apertures 14 in a selected perforation pattern. The perforation pattern comprises the plurality of apertures 14 spaced about the exterior surface area of the central component or tube 16. The apertures 14 are spaced apart along the surface of the tube 16 such that one or more rows of apertures 14 extends substantially along the entire length of the tubular extrusion 14 (e.g., across the tube 16). While two rows of apertures are illustrated in the drawings for purposes of clarity, it should be understood that the perforation pattern may be continuous around the surface of the tube 16 such that there is a plurality of rows of apertures on the outer surface of tube 16. For the illustrated example, there may be up to 9,600 holes or apertures 14 in the perforation pattern on the outer surface of the tube 16. The apertures 14 may range in size as based on selected air flow and pressurization in the air chamber 18 and/or other laser processing conditions which may require larger or smaller holes. In the embodiment illustrated, the apertures 14 are approximately 0.0625" in diameter. The one or more apertures alternatively comprise a series of grooves or slots extending substantially the length (corresponding to web width) of the tube 16 and spaced about around tube 16.

Figure 2:
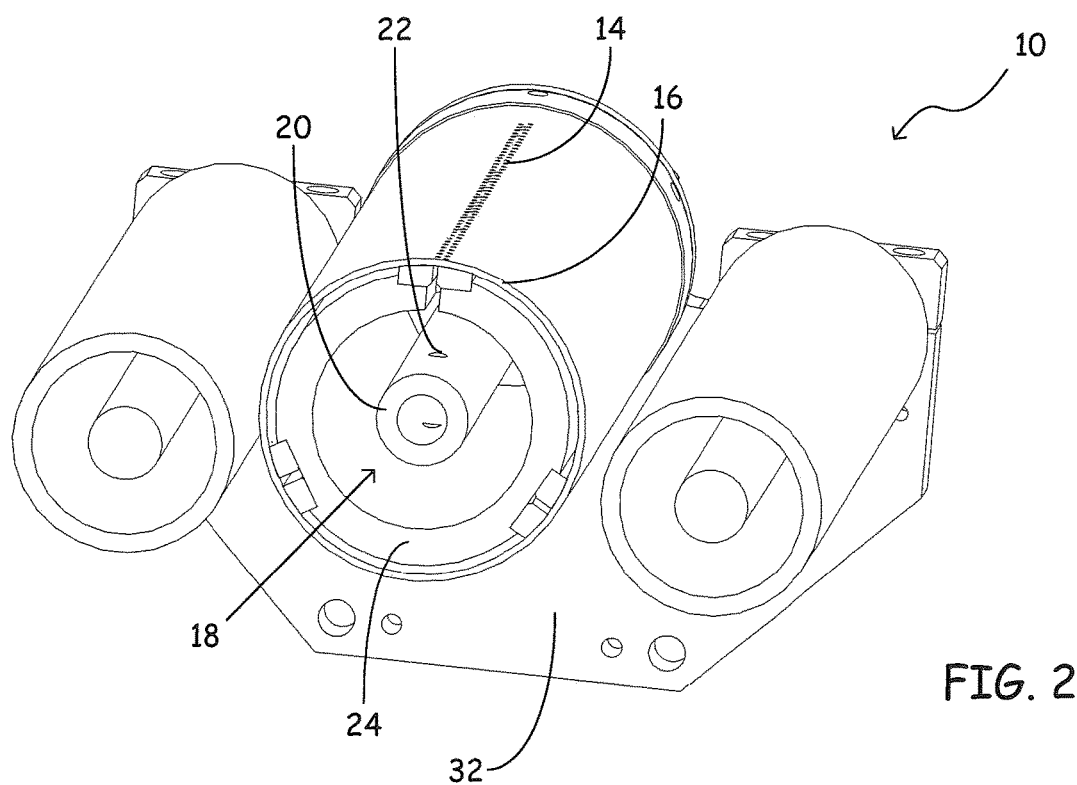
FIG. 2 is a perspective view of the under material air purge system isolated from a laser processing system for ease of description.

As illustrated in FIG. 2, the plurality of apertures 14 may be positioned in a plurality of aligned rows extending longitudinally and substantially across the length of the tube 16. The tube 16 has a length that is sufficient to substantially extend across the width of the web, thus across the laser processing window. The under material air purge assembly 10 is thus configured for positioning within the web path, the processing path of the material 12, such that the material 12 crosses directly over the air purge assembly 12 and is processed concurrently with passing over the apertures 14.

The tube 16 also has a substantially hollow center length, which may also include an inner tubular structure therein and of a smaller cross-section and the enclosure for the air chamber. The inner tubular structure may be a stationary structure having a slot opening 28 extending longitudinally along its length. The tube 16 may be configured to rotate about the inner tubular structure, for example in a concentric manner with the inner tubular structure.

The air chamber 18 may be a cavity in the hollow tube 16 that extends substantially along the length of the tube. Positioned within this cavity is a forced air delivery mechanism 20. For example, the forced air delivered to the air chamber 18 may regulated to 30 PSI. Air flow and pressurization in the air chamber may be adjusted based on various considerations, including but not limited to laser type and intensity, web speed, and/or material composition. The delivery mechanism 20 may be a tube of diameter less than the tube 16 and having one or more through openings 22 positioned along its length for delivering forced air from the source of compressed air to the air chamber 18 of the under material air purge assembly 10. The tube 20 may also operably connect the assembly 10 to a mounting mechanism for positioning the air purge assembly 10 within the laser processing system, for example, on a vacuum box acrylic work support for the laser processing system 100.

The inner tubular structure 24 of the assembly 10 may also be a tube of similar cross-sectional shape and having a diameter or cross-sectional size less than tube 16 but greater than tube 20 such that inner tubular structure 24 surrounds the air delivery mechanism 20. The inner tubular structure 24 is adapted along its length with an exit passageway 28 which provides a first air flow exit passage way from the air chamber 18. The exit passageway may be a slot opening 28 comprised of an aperture extending longitudinally along the length of the inner tubular structure 24. The passageway may alternatively comprise a plurality of smaller openings that similarly extends across the length of the inner tubular structure 24. The slot opening 28 may have a width on the order of about 0.060 inches, or about 0.090 inches or about 0.120 inches. The air flow passageway 28 allows the forced air out of the air chamber at a selected location and position. The air passes through the slot opening 28 into a channel 29 having a corresponding slot opening of equal or reduced width. The channel 29 prevents air from entering a space between the inner tubular structure 24 and the tube 16 and thus ensures that the air travel path is substantially vertical to apertures 14 that are aligned with the opening 28 and channel 29.

The air purge assembly 10 may be a rotatable assembly where the tube 16 comprises a plurality of rows of apertures 14 extending around the outer surface of the tube 16. The tube 16 may then be rotatable about the inner tubular structure 24 and in the machine direction (e.g. direction of the web of material travelling through the laser processing system). The tube 16 may rotate in the direction of the movement of the material 12 through the laser processing window. The rotation of the tube 16 may also aid in moving the foam material 12 through the laser processing system 100 in a substantially continuous manner while separating the carrier liner 11 from the material 12 and passing the carrier liner 11 concurrently under the air purge assembly 10 while the material 12 is passed over the assembly 10.

Where the air purge assembly 10 comprises the rotatable tube 16, tube 20 also allows the air purge assembly 10 to be rotatably mounted on opposing ends to the mount 32. Thus, the tube 16 is an outer shell having a perforation pattern extending around its surface and that is rotatably secured within the laser processing system 100.

Figure 3A:
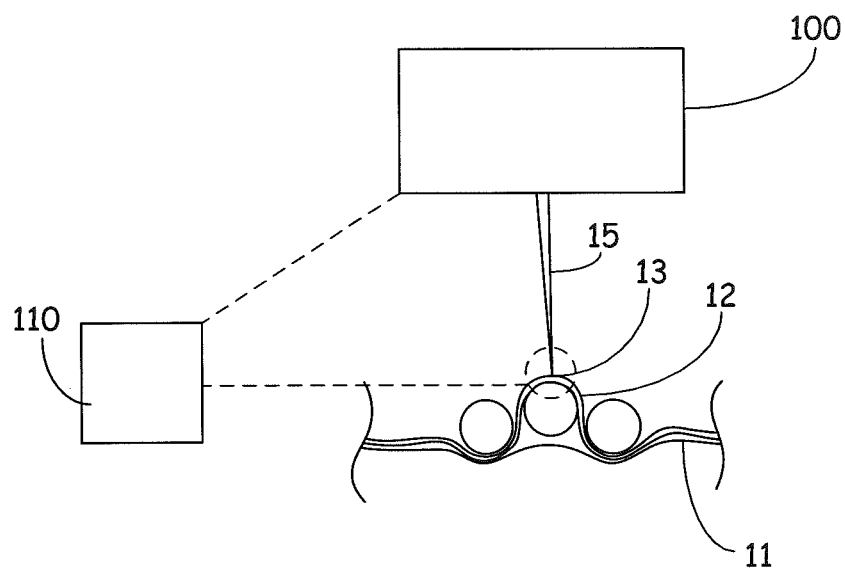
FIG. 3A is a schematic view of a web path and showing the path of the material above the assembly and the separated a carrier liner path below the assembly.
Figure 3B:
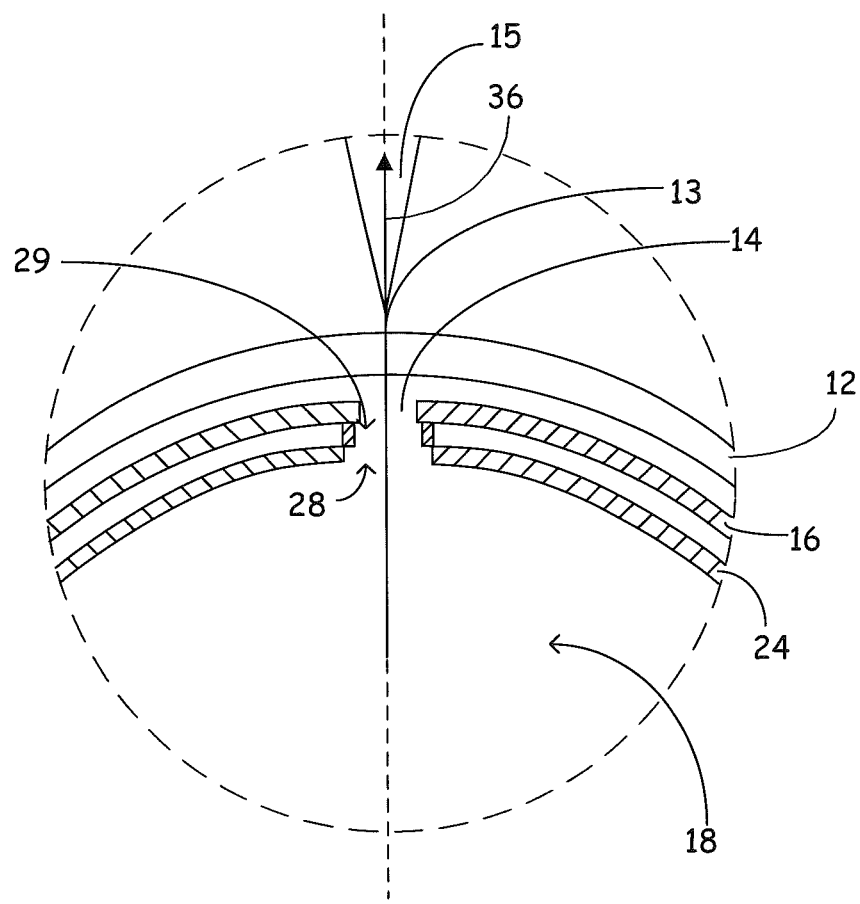
FIG. 3B is an enlarged view of the web path showing the y-axis alignment of the laser beam focal point, the material and apertures of the air purge assembly.

The air purge assembly 10 comprises a closed off or sealed air chamber such that an exit orifice 34 of the assembly 10 is provided by the alignment (e.g. vertical alignment) of apertures 14 and slot opening 28, as well as channel 29. The air chamber 18 is essentially closed off or sealed such that the flow of air (or any suitable gas as may further reduce discoloration, such as nitrogen) directed into the air chamber from mechanism 20 is only allowed to escape through the exit orifice which comprises for example one or more rows of apertures 14. Thus, as tube 16 is rotated, the air in the air chamber 18 is expelled through the slot opening 28 and through channel 29 which directs the air flow then only through the row or rows of apertures 14 that are vertically aligned with or positioned directly over channel 29 and/or slot opening 28 and directly into material 12. The air flow path is illustrated by arrow 36 in FIG. 3B. This allows for forced air to be directed out of the under material air purge assembly 10 at a precise selected location and at a selected timing. A controller 110 is in communication with the laser system 100. The under material air purge assembly 10 is configured to control laser processing and rotation of the web and the tube 16 such that the laser beam 15 contacts the material 12 for processing substantially concurrently with vertical alignment of the slot opening 28, the channel 29 and at least one row of apertures 14. The target location is aligned therewith as illustrated in FIGS. 3A-3B.

In general, the forced air is expelled through apertures 14 in the tube 16 that are aligned with the opening 28 of the inner tubular structure 24. The opening 28 of the inner tubular structure 24 is generally positioned directly under the laser processing target area. That is, the opening 28 of the inner tubular structure 24 is directly below the laser beam focal point or thereabout. The actual focal point of the laser beam may be shifted, for example, above or below the material according to selected processing conditions so as to achieve a selected laser beam diameter or intensity on the material for processing the material as selected (e.g., for forming holes, perforation or cutting, controlling diameter of holes, perforations etc.) for processing the material.

The laser beam is directed to a target location on the material as the target location is positioned near or directly over the aligned apertures 14 and opening 28. Thus, laser processing must be precisely controlled such that the laser is directed to the material for laser processing when the apertures are aligned so that air may be forced into the open cells of the material to pressurize the cells and prevent the plume being generated from attaching to or penetrating the cells, while the material remains flat.

The air purge assembly 10 may also include a timing wheel for rotation of the tube 16. The timing wheel, in cooperation with a registration sensor, allows the controller 110 to read a relative location of one or a pair of rows of apertures 14 as tube 16 rotates and rows of apertures 14 rotate with respect to opening 28. A user selected registration offset parameter in a control software can then be utilized to control, initiate or delay the firing of the laser such that laser processing occurs directly on top of the desired under air purge holes as positioned in the web direction. That is, control of the laser processing of the target area can be selectively controlled such that laser processing is timed with respect to the alignment of the laser beam and laser beam focal point with the apertures 14. Thus, processing portions of the material 12 can be selectively pressurized with the forced air flow in order to minimize the plume from settling in or on the material and thus substantially reducing or even eliminating discoloration and/or odor resulting from laser processing.

The under material air purge assembly 10 may also be positioned between one or more rollers; such as nip rollers positioned on either or both sides of the tube 16. Alternatively, the under material air purge assembly 10 may be positioned within the laser processing system between two nip rollers positioned on either sides of the laser processing window. The rollers aid in movement of the material through the laser processing system 100. The rollers also allow for separation of a carrier liner from the material prior to laser processing and joining of the carrier liner with the material after laser processing.

As discussed throughout this disclosure, the under material air purge assembly 10 may be comprised of one or more metal extrusions. The components may be comprised of aluminum or other like materials which are capable of withstanding high processing temperatures and being durable for repeated use. Further, while the under material air purge assembly illustrated in the figures is comprised of cylindrical tubes, the air purge assembly may comprise extrusions having cross-sectional areas according to any one of various geometric shapes. The under material air purge assembly may comprise an overall rectangular shape having a cross-sectional area akin to an "X" shape where the apertures for air flow are positioned within one or more recesses in an outer facing surface of the under material air purge assembly.

It is further contemplated that localized heating of the material concurrently or directly after laser processing of the foam material may also contribute to decreasing odor and/or discoloration of the material.

Illustrative Example

Reduction in discoloration was observed using an apparatus to pressurize open cells in an open-cell foam material. A non-limiting disclosure of the process is described below.

An under material air purge assembly allowed for evaluation of samples of foam material over a fourteen (14) week assessment period with respect to the discoloration, or yellowing of the foam over time beginning with laser processing at time zero. The yellowing evaluation is done visually, and with a BYK Spectro-Guide, ID # INT COLOR 715A. Unit of measure is YE. Nine (9) SQM each, of foam was run with the under material purge assembly connected to 30 PSI of facility compressed air, with E 400 W Coherent, and E 1000 W Coherent lasers.

Figure 4:
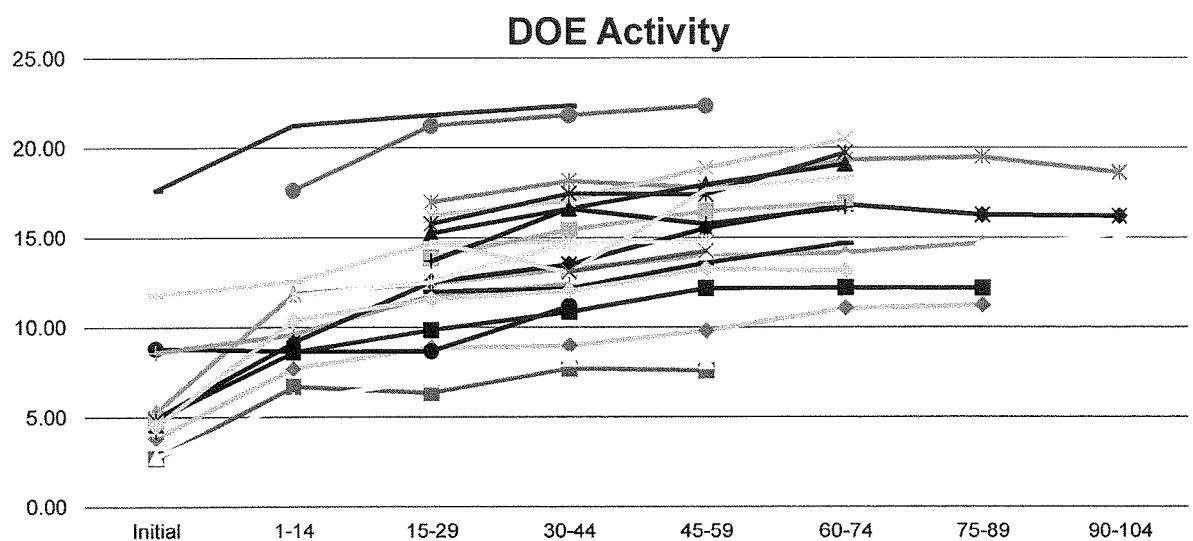
FIG. 4 is a graph showing the reduction in discoloration over time as relates to the use of an under material air purge assembly.
Figure 5:
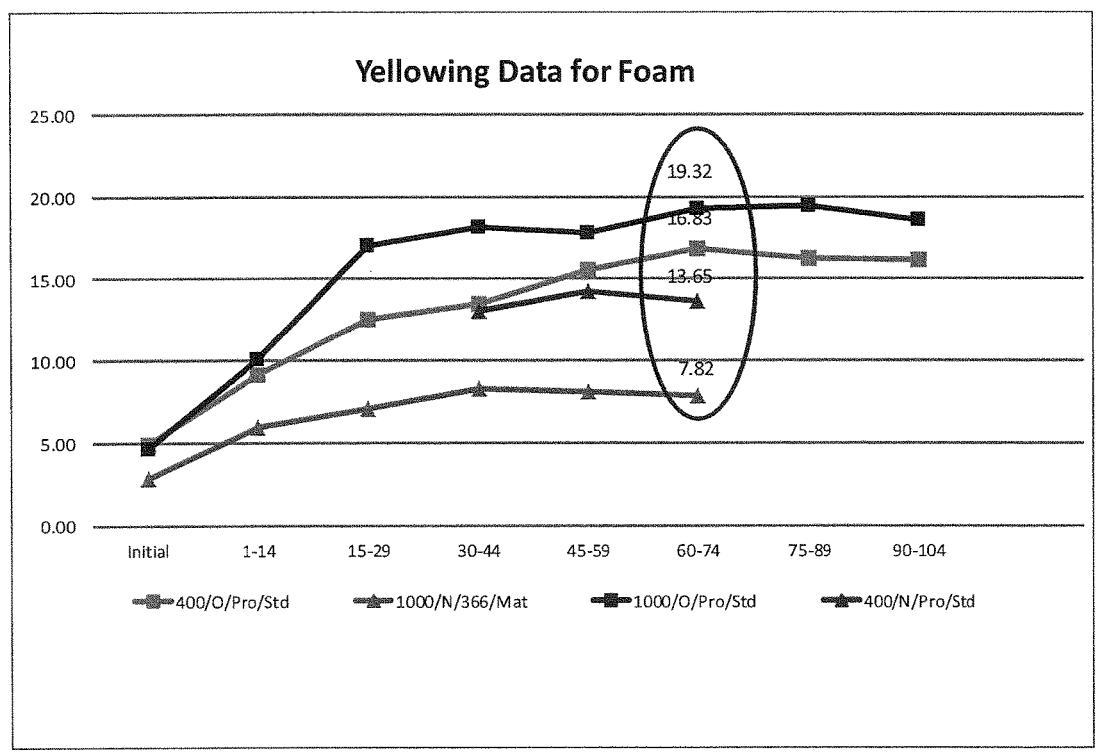
FIG. 5 is a graph showing the further reduction in discoloration over time as relates to the use of an under material air purge assembly.

The foam was separated from the carrier liner and laser processed over the extrusion while the carrier liner passed under the purge assembly. Various open cell foam types were laser processed using an under material air purge system configured to force air into the open cells of the foam for processing. Discoloration was measured incrementally from processing up to 104 days post processing. The initial reduction in discoloration when using an under material air purge assembly is illustrated in FIGS. 4 and 5.

Although the present disclosure has been described with reference to preferred embodiments, workers skilled in the art will recognize that changes may be made in form and detail without departing from the spirit and scope of the disclosure.

What is claimed is:

1. An under material air purge assembly for reducing discoloration of a material resulting from laser processing the material, comprising a forced air delivery mechanism and air chamber having one or more apertures and configured for positioning directly below a material travel path in a laser processing system wherein the one or more apertures are aligned with a focal point of a laser beam of the laser processing system such that air is directed upwardly into the material while laser processing the material wherein the forced air delivery mechanism is a tubular structure having a length sufficient to substantially extend across a width of the material travel path through the laser processing system.

2. The under material air purge assembly of claim 1, wherein the material is a polyurethane based foam material.

3. The under material air purge assembly of claim 1, where-in the forced air delivery mechanism is configured to direct air flow through the one or more apertures in the air chamber directly into an open cell material to pressurize the cells of the material within a target area of the material.

4. The under material air purge assembly of claim 3, wherein the target area is the material processing area aligned with the laser beam.

5. The under material air purge assembly of claim 3, further configured for positioning such that the laser beam and the air flow path are aligned with respect to an axis of the laser beam and its focal point.

6. The under material air purge assembly of claim 1, wherein the tubular structure comprises an outer rotatable tube and an inner stationary tube defining an air chamber.

7. The under material air purge assembly of claim 6, wherein the outer rotatable tube comprises a perforation pattern comprising at least one row of apertures.

8. The under material air purge assembly of claim 7, wherein the inner stationary tube comprises an opening extending longitudinally along its length.

9. The under material air purge assembly of claim 6, where the outer rotatable tube comprises at least one aperture and the inner stationary tube comprises an opening such that the outer rotatable tube is configured to rotate about the inner stationary tube to selectively align the at least one aperture and the opening for directing air out of the air chamber and into the material.

* * * * *